Nov. 24, 1942.    F. E. FREY    2,303,118
PROCESS FOR CATALYTIC HYDROGENATION OF LIQUID HYDROCARBONS
Filed Oct. 12, 1939
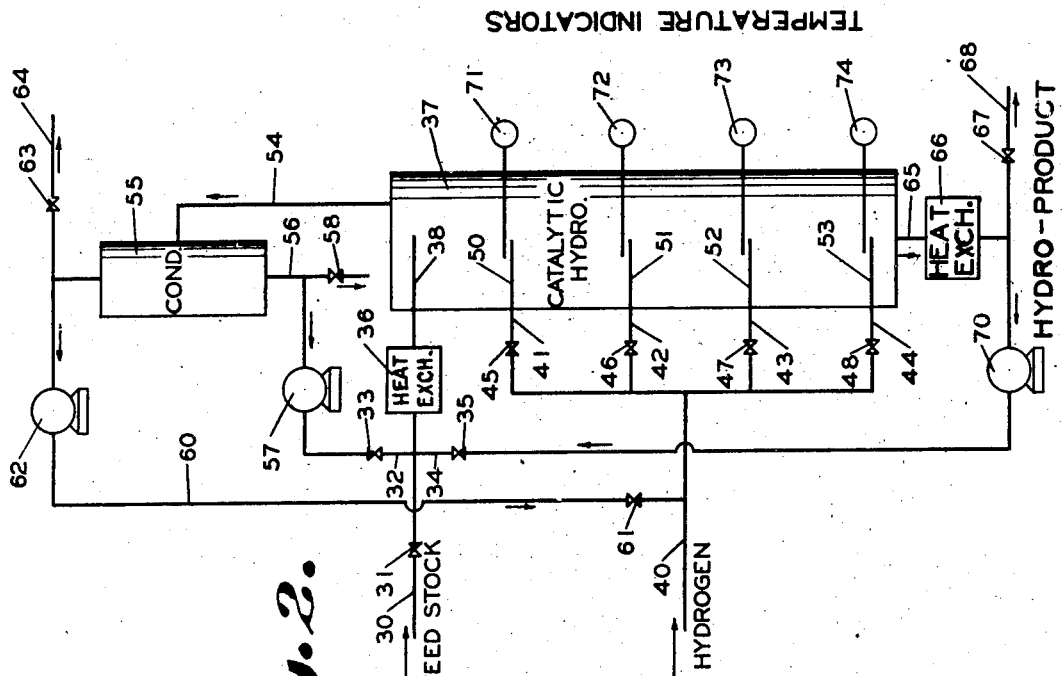
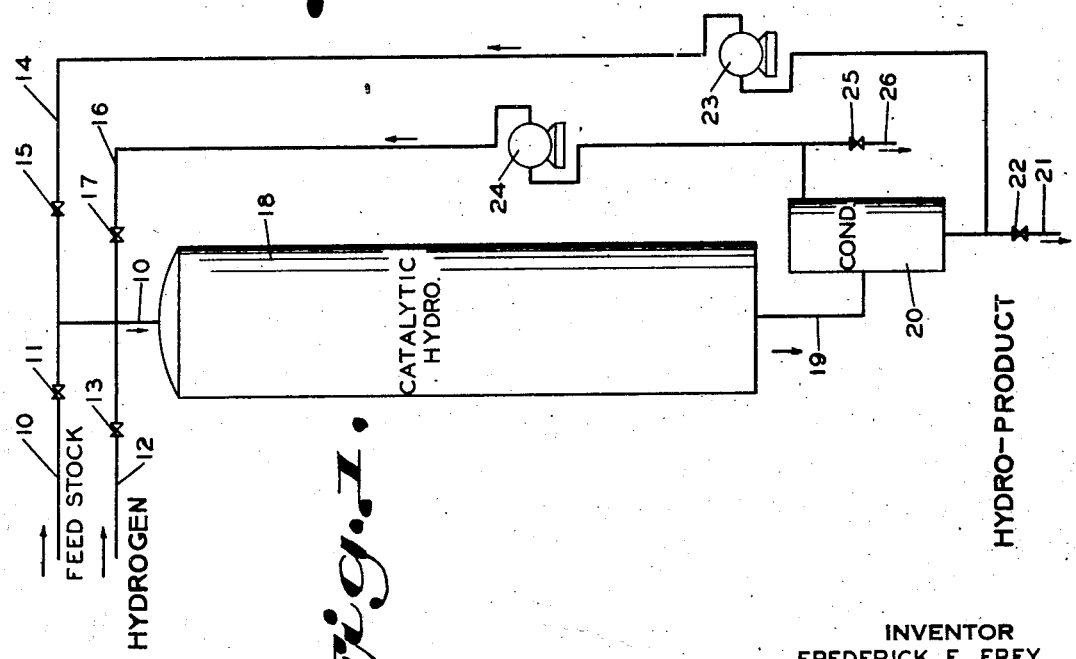
INVENTOR
FREDERICK E. FREY
BY Hudson, Young, Shanley and Yinger
ATTORNEYS Patented Nov. 24, 1942

2,303,118

UNITED STATES PATENT OFFICE

2,303,118

PROCESS FOR CATALYTIC HYDROGENATION OF LIQUID HYDROCARBONS

Frederick E. Frey, Bartlesville, Okla., assignor to Phillips Petroleum Company, a corporation of Delaware Application October 12, 1939, Serial No. 299,219

10 Claims. (Cl. 196—72)

This invention relates to catalytic hydrogenation and particularly to catalytic non-destructive hydrogenation of normally liquid hydrocarbons; and is especially applicable to the olefin hydrocarbons that boil in the range of motor fuel and not above about 375° F., such as the olefins corresponding to the paraffins in a petroleum fraction containing heptane and heavier hydrocarbons through undecane.

Because of the exothermic nature of the hydrogenation reaction, much heat is liberated when unsaturated organic compounds, such as olefin hydrocarbons boiling in the range of motor fuel, are hydrogenated. For example, when diisobutylene is hydrogenated in the vapor phase to isoctane, the amount of heat liberated is of the order of 500 B. t. u. per pound, which is equivalent to a temperature rise of about 900° F. under adiabatic conditions. When the hydrogenation is effected with the aid of a catalyst, control of the temperature of the catalyst is highly important. If the temperature is not controlled properly, portions of the catalyst may become overheated; this results in undesired products from side reactions such as destructive hydrogenation, in a decreased yield, and often in an increased rate of deactivation and/or deterioration of the catalyst, as by sintering of active catalytic points.

It has been proposed to hydrogenate non-destructively such highly olefinic material as olefin polymers of gasoline boiling range by admixing hydrogen and passing the mixture in a vaporous state over a bed of catalyst contained in an elongated tube or multiplicity of tubes of cross-sectional area so restricted as to permit the ready extraction of heat of reaction by applying externally a cooling fluid, whereby the proper temperature level for the reaction within the catalyst bed is maintained.

It has also been proposed to hydrogenate non-destructively various oils by percolating them while in the liquid state through a bed of granular or similarly disposed solid catalyst in the presence of hydrogen, whereby hydrogenation is effected to an extent so controlled and limited that temperature rise is limited. In such a case a simple massive body of catalyst suffices, the limited extent of hydrogen consumption permitted insuring that destructive temperature rise does not occur. Since hydrogen tends to penetrate the oil film but slowly, the use of spray and forced flow devices has been proposed, or a fine catalyst suspension in a body of oil substituted through which hydrogen is bubbled.

My invention consists in novel means coupled with specific conditions, whereby olefinic gasoline can be continuously hydrogenated by a static catalyst bed in simple bulk catalyst containers, with extensive per-pass conversion, rapid reaction, and protection of the catalyst against undue temperature rise, both in the mass and at active catalytic surface points. I introduce hydrocarbon as liquid and vapor in the presence of hydrogen to a catalyst bed, and by maintaining pressure, concentration, and molecular weight within limits to be set forth, cause hydrogenation to take place with absorption of heat by progressive vaporization of liquid at the catalyst surface and at the temperature of the reaction, whereby both mass and local temperature rise are limited. A somewhat sub-critical temperature is maintained by such regulation whereby surface tension is kept low, liquid film on the catalyst being accordingly thin and permeable to hydrogen, and rapid reaction furthered in this way. Rapid reaction is further assisted by the use of catalyst granules of small size, which low hydrocarbon surface tension permits, with correspondingly high active surface per unit volume.

My process is also concerned with means whereby a limited dilution of the olefinic reactant hydrocarbon by saturated hydrocarbons is maintained to control extent of evaporation and means for effecting by counterflow of hydrogen, concurrently with evaporation, complete saturation of olefin, together with efficient use of hydrogen containing inert impurities.

It is an object of this invention to provide an improved process of effecting the catalytic and non-destructive hydrogenation of normally liquid hydrocarbons such as the olefin hydrocarbons boiling in the gasoline range.

Another object is the use of a simple massive catalyst body without special means of indirect heat abstraction.

It is a further object of this invention to decrease the temperature rise that results from the liberation of heat during the catalytic hydrogenation of normally liquid unsaturated hydrocarbons.

It is a further object of this invention to effect simultaneous hydrogenation and vaporization of unsaturated hydrocarbon liquids.

It is a further object of this invention to obtain a high volumetric rate of hydrogenation relative to the volume of catalyst.

Another object of this invention is to utilize impure hydrogen with increased efficiency.

Other objects and advantages of this invention will be apparent to those skilled in the art from the following description, the accompanying drawing, and the appended claims.

The invention may be described most readily with reference to the accompanying drawing, in which:

Figure 1 is a diagrammatic view of an arrangement of apparatus suitable for the practice of my invention under certain operating conditions; and Figure 2 is a diagrammatic view of an arrangement of apparatus suitable for the practice of my invention under certain other operating conditions.

It will be obvious to those skilled in the art that modifications other than those specifically shown may be used without passing beyond the scope of this invention.

In reference to Figure 1, the liquid feed stock, consisting substantially of one or more unsaturated hydrocarbons such as olefins boiling in the motor-fuel range, is charged to the process through pipe 10, which is supplied with a control valve 11. Gaseous hydrogen is added to the feed stock through pipe 12, which is supplied with a control valve 13. Recycle stock, consisting of substantially totally hydrogenated hydrocarbon material, may be added through pipe 14, the addition being controlled by valve 15. Similarly, unusued hydrogen may be recycled and added through pipe 16, the addition being controlled by valve 17. The resultant mixture passes into the upper end of the vertical catalytic hydrogenator 18, which contains a suitable solid hydrogenation catalyst, not shown. Within the hydrogenator the hydrocarbon material and the hydrogen flow concurrently and downwardly in simultaneous contact with the hydrogenation catalyst, the temperature in the upppermost part of the hydrogenator being such that at least about one half of the hydrocarbon material is in the liquid phase at the pressure prevailing in the hydrogenator, the hydrogen being in the gaseous state. Because of the presence of the catalyst, hydrogenation takes place; as a result heat is liberated that tends to increase the temperature. As the temperature rises in this manner, hydrocarbon material is caused to vaporize, whereby latent heat of vaporization is absorbed. This absorption limits or decreases the temperature rise that can be effected by the heat of hydrogenation. As the hydrocarbon material continues in its downward passage through the hydrogenator, more and more of it becomes hydrogenated; and more and more of it becomes vaporized, until in the lowermost part of the hydrogenator a major part or substantially all of it may be in the vapor phase. By the time it reaches the lowermost part of the hydrogenator it is also substantially completely hydrogenated. The hydrogenated material then passes from the hydrogenator, together with unused hydrogen and any residual unvaporized hydrocarbon material, through pipe 19 into the condenser 20, which effects a separation of the hydrogen and the hydrogenated hydrocarbon material by condensation of the latter. The condensed hydrocarbon material may be withdrawn as a liquid product through pipe 21, the withdrawal being controlled by valve 22; or part of it may be recycled back to the process through pipe 14 by means of the pump 23. The unused hydrogen may be recycled similarly back to the process through the pipe 16 by means of pump 24; if desired, part or all of the unused hydrogen may be withdrawn from the process through valve 25 and pipe 26.

In reference to Figure 2, the liquid feed stock consisting substantially of one or more olefins boiling in the gasoline range, is charged to the process through pipe 30 in amount controlled by valve 31. Reflux stock consisting partly of previously hydrogenated material is added through pipe 32 in amount controlled by valve 33. Similarly recycle stock consisting of substantially completely hydrogenated material is added through pipe 34 in amount controlled by valve 35. The resultant mixture passes through the heat exchanger 36, where it is adjusted in temperature to any desired value; frequently, the heat exchanger 36 is unnecessary and may be omitted, if desired. Then the mixture passes into the upper end of a vertical catalytic hydrogenator 37, being distributed thereinto by the rose 38, which may take the form of a perforated loop, if desired. The hydrogenator 37 is filled with a suitable solid hydrogenation catalyst, not shown.

Simultaneously, gaseous hydrogen at a pressure from 350 to 1000 pounds per square inch is charged to the process through pipe 40, which is subdivided into a number of branches such as pipes 41, 42, 43, and 44, provided with control valves 45, 46, 47, and 48. These branch pipes communicate with the hydrogenator 37 at a number of points removed from the top, as through the roses 50, 51, 52 and 53.

The liquid hydrocarbon material and the hydrogen flow in a generally countercurrent relationship and in simultaneous contact with the hydrogenation catalyst. Some of the hydrocarbon material vaporizes and joins the hydrogen stream, the amount vaporized being determined by the temperature in the hydrogenator and the rate at which hydrogen is flowing through the hydrogenator. Hydrogenation takes place, liberating the heat of hydrogenation, which tends to increase the temperature. Any increase in temperature causes additional hydrocarbon material to vaporize, whereby heat is absorbed as latent heat of vaporization. The vaporized hydrocarbon material is carried by the hydrogen stream through pipe 54 into the condenser 55, where it is substantially separated from the unused hydrogen by condensation. The condensed hydrocarbon material, which is generally only partly hydrogenated, is returned as reflux stock to the hydrogenator through pipes 56 and 32 by means of pump 57; if desired, it may be discharged from the process through valve 58. The unused hydrogen may be recycled back to the process through pipe 60 having control valve 61 by means of pump 62, or it may be discharged from the process through valve 63 and pipe 64. The hydrocarbon material that does not become vaporized in the hydrogenator 37 continues downward in contact with hydrogen and with the catalyst until it reaches the bottom end of the hydrogenator, by which time it is substantially completely hydrogenated. The material thus hydrogenated is withdrawn from the hydrogenator through pipe 65, cooler or heat exchanger 66, valve 67, and pipe 68; if desired, a part is returned to the process as a recycle stock through pipe 34 by means of pump 70.

In the arrangement of Figure 2, control of the temperature at any point in the hydrogenator 37 is obtained to a nicety by selection of the point or points of entry of the hydrogen and of the rate of throughput of hydrogen. That is, hydrogen is added at whatever point or points the temperature tends to increase above that desired; the influx of hydrogen at such points causes local vaporization of hydrocarbon material, the result being that the temperature is decreased because of the absorption of the latent heat of vaporization. This feature of my invention is especially useful because the points of the catalyst bed at which the temperature tends to become excessive shift as the catalyst becomes deactivated through use. When the catalyst is fresh, the temperature tends to rise excessively in a zone near the top of the hydrogenator, where the major part of the hydrogenation then takes place, but after the catalyst has become somewhat deactivated, the zone of greatest temperature rise is relatively lower in the hydrogenator. Hence, as the zone of high temperature moves downward, the addition of hydrogen is controlled in such wise that most of it is added in the zone, whereby the temperature is limited or decreased in the manner already described.

The temperature at any point in the hydrogenator 37 may be determined by any suitable means that are known to the art, as for example by thermocouples or pyrometers 71, 72, 73 and 74.

In the practice of my invention it is desirable or necessary that the olefinic feed stock be diluted to a more or less predetermined olefin content. As has been explained, the dilution is effected by the addition of material that is partly hydrogenated (reflux stock) and, if necessary, of material that is substantially completely hydrogenated (recycle stock). I have found that at least one mol of saturated hydrocarbon material, or diluent, of substantially the same boiling range should be present in the feed stock for every mol of olefin introduced. While as many as about nine mols of diluent per mol of olefin may be used, larger amounts within this range will generally not be necessary. A preferred mol ratio of diluent to olefin will generally be found between about 2:1 and 5:1. The olefin content may be determined by means well known to the art, as by bromination.

A suitable hydrogenation catalyst is a nickel-containing catalyst such as may be prepared by treating a porous support such as pumice, activated alumina, porcelain, charcoal, or the like with a concentrated solution containing nickel nitrate, drying and calcining, and then treating the mixture with hydrogen at a temperature above about 300° F. Various other known hydrogenation catalysts may also be used provided they possess activity in the temperature range where liquid conditions are possible, but a nickel-containing catalyst is preferred because of its low cost and ease of preparation.

The pressure within the hydrogenator should be from about 350 to about 1000 pounds per square inch. Lower pressures are unsuitable because they permit relatively too much vaporization to take place at the temperature of hydrogenation over a nickel catalyst or prevent the use of the near-critical region to minimize surface tension; higher pressures are unsuitable because they hinder sufficient vaporization or cause needless expense.

The concentration of hydrogen in the hydrogenator preferably should be in the range from 30 to 70 mol per cent, although higher and lower concentrations, from about 20 to about 80 mol per cent, may be used, the hydrogen being present in at least molal equivalence to the olefins present.

The conditions whereby in my process hydrogenation is carried out require for their fulfillment the stipulation of the effective ranges of certain conditions, and these have been set forth in the foregoing paragraphs. The selection of cooperating conditions is facilitated by a consideration of vaporization in the near-critical region. Hydrocarbons to be hydrogenated in my process will consist chiefly of olefins of 6 to 12 carbon atoms per molecule for which critical temperatures ascend from 400 to 650° F. and criticial pressures range from 400 to 600 pounds per square inch, or somewhat more for wide-boiling mixtures. Olefins and corresponding paraffins, resulting from hydrogenation, differ to only an immaterial degree in these near-critical temperature-pressure relationships, and the partial pressure of hydrogen accompanying the hydrocarbon affects only immaterially these relationships. Accordingly, with a hydrocarbon material of known mean molecular weight to be hydrogenated and the desired molecular ratio of hydrogen to hydrocarbon selected, the appropriate temperature and pressure are readily computed. For best results the temperature shall range between the critical and 150° F. below the critical for the hydrogenation reaction, while the hydrocarbon partial pressure exceeds 250 and preferably 450 pounds per square inch.

Considering the whole hydrocarbon range I may hydrogenate, the temperature of the catalyst may vary from about 250 to about 550° F., depending upon the foregoing conditions and also upon such factors as the mode of operation, the acitivity of the catalyst, and the relative position of the portion of catalyst in question. For example, it may be from about 250 to about 400° F. in the part adjacent to the point of entry of feed stock and from about 350 to about 550° F. in the part adjacent to the point of exit of the completely hydrogenated material.

The temperature of the hydrocarbon material entering the hydrogenator should be lower than the lowest temperature prevailing in the hydrogenator. It can be adjusted to suit any desired conditions by devices well known to the art, such as the heat exchanger 36 in Figure 2; preferably, however, it is adjusted by control of the temperature of the condensers 20 and 55 in Figures 1 and 2, respectively, whereupon the heat exchanger may be omitted, as illustrated in Figure 1. The temperature of these condensers must be low enough to effect substantial separation of the hydrocarbon material from the hydrogen; but it may be advantageously high enough that the reflux material coming therefrom need not be preheated before being passed into the hydrogenator. A suitable temperature generally is from about 80 to about 225° F.; such a temperature does not cause too great a chilling effect upon entry of the hydrocarbon material into the hydrogenator and it leads to the advantage that considerable heat of hydrogenation is removed as sensible heat that is used up to heat the feed material to the temperature prevailing in the upper part of the hydrogenator.

The following examples illustrate some of the possible modes of operation of my process. They should not be construed as limitations of my invention.

*Example I*

The arrangement shown in Figure 1 was used for the hydrogenation of a polymer gasoline consisting substantially of diisobutylene at a pressure of 750 pounds per square inch and a hydrogen concentration of about 50 mol per cent. The catalyst consisted of nickel, copper, and alumina deposited together on pumice. The feed stock was diluted with three volumes of recycle stock, which consisted of substantially completely hydrogenated gasoline or octane from the process, for each volume of feed stock. The thus diluted feed stock and the hydrogen entered the vertical hydrogenator simultaneously at its upper end. About two-thirds of the hydrocarbon material remained in the liquid phase near the point of entry, where the temperature was 400° F. As the hydrocarbon material progressed downwardly through the hydrogenator and underwent hydrogenation, its temperature increased until it was 490° F. near the exit at the bottom end of the hydrogenator, where hydrogenation was substantially complete. Thus, the temperature was increased by only 90° F.; whereas, if the hydrocarbon material had been completely in the vapor phase at the temperature of the inlet, 400° F., as would have been the case if the pressure had been less than about 320 pounds per square inch, the temperature would have been increased by about 190° F. by heat of reaction, and still further increased by heat accumulated in the lower part of the catalyst bed from a hydrogenation of a preceding part of the stream and conducted against the stream of reactants within the catalyst body.

*Example II*

In another example, the conditions were exactly as stated in Example I except that the feed stock was diluted with two instead of three volumes of recycle stock. The temperature near the exit was about 555° F. This is only 155° F. higher than that near the inlet; whereas, if the hydrocarbon material had been completely in the vapor phase at the temperature of the inlet, it would have been about 250° F. higher or 650° F., at which some undesirable destructive hydrogenation can occur.

*Example III*

The arrangement shown in Figure 2 was used. A polymer gasoline made by subjecting a mixture of propylene and isobutylene to simultaneous polymerization was hydrogenated at a pressure of 750 pounds per square inch and a hydrogen concentration of 50 mol per cent. The catalyst consisted of nickel, copper, and alumina deposited on pumice. The feed stock was diluted with reflux stock and with recycle stock until it contained only 35 per cent olefins at the point of entry into the hydrogenator; it had a temperature of about 200° F. some distance away from the hydrogenator. The diluted feed stock was passed into the upper part of the hydrogenator, where hydrogenation progressed rapidly enough to raise its temperature to about 400° F. Hydrogen was passed simultaneously into the hydrogenator at the bottom end at a rate which maintained a temperature of 400° F. The vapor carried out of the hydrogenator by the stream of unused hydrogen was condensed and returned as liquid reflux stock to the hydrocarbon feed pipe to dilute the feed stock. The product, which was hydrogenated to the extent of 99 per cent, was withdrawn as liquid from the bottom end of the hydrogenator; a part of this substantially completely hydrogenated material, after being cooled somewhat, was returned to the hydrocarbon feed pipe as recycle stock to aid in maintaining an olefin-content of 35 per cent in the hydrocarbon material entering the hydrogenator. The maximum temperature, which was in the middle of the catalyst bed, was only about 450° F.

*Example IV*

The arrangement of Figure 2 may be used for the hydrogenation of a polymer gasoline made by the polymerization of a mixture of isobutylene and normal butylene. Thus, the hydrogenation is effected at a pressure of 750 pounds per square inch and at a temperature which varies from 300° F. at the top of the hydrogenator to a final temperature of about 450° F. at the bottom. The feed stock is diluted with all of the reflux stock and with a relatively small amount of recycle stock to an olefin content of 50 per cent. Hydrogen, to a total concentration of about 50 mol per cent, is passed into the hydrogenator at two points; a small amount at the bottom and a much larger amount in the zone of highest temperature. By such addition, the zone of highest temperature is kept at between 400 and 450° F. As the catalyst gradually becomes deactivated, the point of entry of the major part of the hydrogen is shifted in accordance with the shift in the zone of highest temperature.

In such cases as the foregoing ones, catalyst granules of 10–20 or 20–40 mesh per inch were employed without carbon inclusions or sluggish reaction, such as result from high surface tension and resultant excessive liquid hold-up in the granules. Hydrogenation rates exceeding 5 liquid volumes of olefin per volume of catalyst bed per hour were repeatedly attained.

By the practice of my invention I have effected the catalytic and non-destructive hydrogenation of normally liquid hydrocarbons such as olefin hydrocarbons boiling in the gasoline range under advantageous conditions of temperature control. The temperature rise resulting from the liberation of heat during such hydrogenation has been decreased and prevented from becoming so high that destructive hydrogenation and sintering of the catalyst could take place. The temperature rise was limited by localized or controlled vaporization of the hydrocarbon liquid undergoing hydrogenation.

I do not wish to exclude from my invention any modifications or variations that will be obvious to those skilled in the art. Nor do I wish to exclude the use of auxiliary equipment such as pressure regulators, flowmeters and the like known devices that may facilitate the practice of my invention. For example, the various streams of material may be placed in heat-exchange relationship with one another to any desired degree. Hence, it is to be understood that, within the scope of the appended claims, my invention is as extensive in scope and equivalents as the prior art allows:

I claim:

1. In a process for the catalytic, non-destructive hydrogenation of unsaturated normally liquid hydrocarbons boiling within the gasoline range in an enlarged reaction zone operated without substantial loss of heat to an external heat exchange medium and in which the unsaturated hydrocarbons and hydrogen are passed through said reaction zone at a nondestructive reaction temperature within the range of about 250 to 550° F. and at a pressure in the range of about 350 to 1000 pounds per square inch, the method of controlling the exothermic heat of reaction and limiting the temperature rise of the hydrocarbon material passing through said hydrogenation zone which comprises admixing with said unsaturated hydrocarbons saturated hydrocarbon material corresponding in boiling range to said unsaturated hydrocarbons charged to the process, regulating the temperature and pressure of the combined charge such that a substantial portion thereof entering said reaction zone will be in liquid phase and such that there is a progressive vaporization of hydrocarbon material passing through said hydrogenation zone, and also regulating the amount of said admixed saturated material such that at least a part of the reacting hydrocarbon material immediately before leaving said reaction zone will still be in liquid phase.

2. In a process for the catalytic, nondestructive hydrogenation of unsaturated hydrocarbons boiling within the gasoline range, the steps which comprise passing to one end of a relatively large hydrogenation chamber containing a catalytic hydrogenation zone a hydrocarbon stream containing said unsaturated hydrocarbons together with corresponding saturated hydrocarbons and predominantly in liquid phase, passing also to said hydrogenation chamber a stream containing gaseous free hydrogen and introducing same in a manner adapted to maintain a decreased hydrogen concentration in the direction of flow of liquid hydrocarbon material, maintaining a hydrogenation pressure in said hydrogenation chamber such that there is a progressive vaporization of hydrocarbon material as it passes through said hydrogenation chamber and a relatively low nondestructive hydrogenation temperature in said chamber adjacent the point of addition of said hydrocarbon stream, conducting said hydrogenation without substantial removal of heat by a cooling medium in indirect heat exchange relationship with said hydrogenation zone maintaining a reaction time such that hydrocarbon material withdrawn as a product is essentially completely saturated and admixing with said unsaturate-containing hydrocarbon stream a sufficient amount of corresponding saturated hydrocarbons that at least a part of the hydrocarbon material adjacent the latter part of the hydrogenation zone is in liquid phase under the hydrogenation conditions existing at that point.

3. The process of catalytic non-destructive hydrogenation of relatively volatile normally liquid olefin hydrocarbons boiling in the motor fuel range, which comprises simultaneously feeding said liquid hydrocarbons together with recycled hydrogenated hydrocarbons and hydrogen into the upper part of a vertical hydrogenator containing a supported hydrogenation catalyst at a temperature within the range 250 to 550° F. in such amounts that the pressure is in the range 350 to 1000 pounds per square inch and that the hydrogen concentration is from 30 to 70 mol per cent of the hydrocarbons present and sufficient to effect complete saturation of said olefin hydrocarbons, operating said process without substantial removal of heat by a cooling medium in indirect heat exchange relationship with hydrogenator, maintaining said temperature and pressure such that a substantial amount of the hydrocarbon material at the top of said hydrogenator is in liquid phase and such that there is a progressive increase in temperature from top to bottom of said hydrogenator and substantially complete hydrogenation and vaporization of the hydrocarbons take place, withdrawing the hydrogenated and vaporized hydrocarbons from the bottom part of the hydrogenator, and separating the hydrogenated and vaporized hydrocarbons from the unused hydrogen by condensation and recycling a portion of said hydrogenated hydrocarbons.

4. The process of catalytic non-destructive hydrogenation of relatively volatile normally liquid olefin hydrocarbons boiling in the motor fuel range, which comprises feeding said liquid hydrocarbons into the upper part of a vertical hydrogenator containing a supported hydrogenation catalyst at a temperature within the range 250 to 550° F. and not greater than the critical temperature of the resultant mixture, simultaneously feeding hydrogen into the bottom part of the said hydrogenator, maintaining a pressure in the hydrogenator of from 350 to 1000 pounds per square inch and a hydrogen concentration sufficient to effect complete saturation of said olefin hydrocarbons, operating said hydrogenator without substantial removal of heat by a cooling medium in indirect heat exchange relationship with said catalyst, withdrawing hydrogen and vaporized hydrocarbons from the uppermost part of the hydrogenator, condensing the said vaporized hydrocarbons and returning them as a liquid to the upper part of the hydrogenator, withdrawing unvaporized hydrocarbons from the lowermost part of the hydrogenator and maintaining a reaction time sufficient to effect substantially complete saturation of said withdrawn hydrocarbons.

5. The process of catalytic non-destructive hydrogenation of normally liquid olefin hydrocarbons boiling in the gasoline range, which comprises feeding said liquid hydrocarbons into the upper part of a vertical hydrogenator containing a supported hydrogenation catalyst at a temperature within the range 250 to 550° F., simultaneously feeding hydrogen into the hydrogenator at at least one point below the point of entry of the said hydrocarbons, maintaining a pressure in the hydrogenator of from 350 to 1000 pounds per square inch and a hydrogen concentration sufficient to effect complete saturation of said olefin hydrocarbons, operating said hydrogenator without substantial removal of heat by a cooling medium in indirect heat exchange relationship with said catalyst, withdrawing hydrogen and vaporized hyrocarbons from the uppermost part of the hydrogenator, condensing the said vaporized hydrocarbons and returning them as a liquid to the upper part of the hydrogenator, and withdrawing unvaporized hydrocarbons from the lowermost part of the hydrogenator.

6. The process of catalytic non-destructive hydrogenation of relatively volatile normally liquid olefin hydrocarbons boiling in the motor fuel range, which comprises feeding said liquid hydrocarbons into the upper part of a vertical hydrogenator containing a supported hydrogenation catalyst at a temperature within the range 250 to 550° F., simultaneously feeding hydrogen in relatively small amount into the bottom part of the hydrogenator and additional hydrogen in relatively large amount into the zone of highest temperature, maintaining a pressure in the hydrogenator of from 350 to 1000 pounds per square inch and a hydrogen concentration of from 30 to 70 mol per cent of the hydrocarbons present and sufficient to effect complete saturation of said olefin hydrocarbons, operating said hydrogenator without substantial removal of heat by a cooling medium in indirect heat exchange relationship with said catalyst, withdrawing hydrogen and vaporized hydrocarbons from the uppermost part of the hydrogenator, condensing the said vaporized hydrocarbons and returning them as a liquid to the upper part of the hydrogenator, and withdrawing unvaporized hydrocarbons from the lowermost part of the hydrogenator.

7. A process for the catalytic, non-destructive hydrogenation of relatively volatile normally liquid olefin hydrocarbons boiling in the motor-fuel range, which comprises passing a liquid hydrocarbon material consisting essentially of normally liquid paraffins and olefins of not more than twelve carbon atoms per molecule with a mol ratio of paraffins to olefins between 1:1 and 9:1, and hydrogen in an amount at least equivalent to the olefins present, through a hydrogenation zone of relatively large cross section containing a solid hydrogenation catalyst at a reaction temperature between about 250 and 550° F. and pressure between about 350 and 1000 pounds per square inch and operated without substantial removal of heat by a cooling medium in indirect heat exchange relationship with said hydrogenation zone, the reaction temperature and pressure being so regulated with respect to the boiling range of the hydrocarbon material charged that at least a major portion of said hydrocarbon material is in the liquid phase while in contact with the initial portion of said solid catalyst and so that at least some unvaporized hydrocarbon material is present immediately prior to contact with the final portion of said solid catalyst, the liquid hydrocarbon material vaporizing as it passes through the chamber as a result of exothermic heat of reaction, maintaining said material in contact with said catalyst for a period of time sufficient to effect substantially complete hydrogenation of the olefins charged, and subsequently recovering a hydrogenated hydrocarbon product.

8. A process for the catalytic, non-destructive hydrogenation of normally liquid olefin hydrocarbons boiling in the gasoline range, which comprises passing a liquid hydrocarbon material consisting essentially of $C_7$ and $C_8$ paraffins and olefins, with a mol ratio of paraffins to olefins between 1:1 and 9:1, and hydrogen in an amount in excess of that equivalent to the olefins present, to the top portion of a substantially vertical hydrogenation zone containing a solid hydrogenation catalyst and operated without substantial removal of heat by a cooling medium in indirect heat exchange relationship with said hydrogenation zone, maintaining a pressure between 350 and 1000 pounds per square inch and an increasing reaction temperature between about 250 and the critical temperature of said material in the direction of fluid flow, regulating the reaction pressure and temperature with respect to the boiling range of the hydrocarbon material charged so that at least a major portion of said hydrocarbon material is initially in the liquid phase and so that at least a small portion of said hydrocarbon material is in the liquid phase immediately before reaching the point of highest reaction temperature, the liquid hydrocarbon material vaporizing as it passes through the chamber as a result of exothermic heat of reaction, maintaining a reaction time sufficient to effect substantially complete hydrogenation of the olefins charged, and subsequently recovering a hydrogenated hydrocarbon product.

9. A process for the catalytic, nondestructive hydrogenation of low-boiling unsaturated hydrocarbons, which comprises passing to a hydrogenation process an initial normally liquid hydrocarbon material boiling in the motor fuel range and comprising normally liquid unsaturated hydrocarbons of not more than twelve carbon atoms per molecule, adding thereto a recycle saturated hydrocarbon material of similar boiling characteristics and substantially completely saturated in an amount sufficient to produce a resultant mixture containing saturated and unsaturated hydrocarbons in a ratio between 1:1 and 9:1, passing the resulting mixture predominantly in liquid phase to the top of a vertical elongated hydrogenation chamber containing a hydrogenation catalyst in a hydrogenation zone and operated without substantial loss of heat to a heat exchange medium in indirect heat exchange relationship with said hydrogenation zone, flowing liquid hydrocarbons from top to bottom through said hydrogenation chamber, maintaining in said hydrogenation zone reaction conditions suitable for nondestructive hydrogenation and such that a substantial amount of hydrocarbon material present therein is in liquid phase at the top of said zone and also such that at least a part of the reacting hydrocarbon material immediately before leaving said zone will still be in liquid phase, liquid hydrocarbon material vaporizing as it passes through said zone as a result of exothermic heat of reaction, adding free hydrogen to said hydrogenation zone in an amount in excess of that required to saturate unsaturated hydrocarbons charged to said chamber, withdrawing a saturated hydrocarbon material from the bottom of said hydrogenation chamber having substantially the same boiling characteristics as said initial normally liquid hydrocarbon material, returning a portion of said saturated hydrocarbon material to the top of said hydrogenation chamber as said recycle saturated material, and recovering a further portion of said material as a product of the process.

10. A process for the catalytic, nondestructive hydrogenation of low-boiling unsaturated hydrocarbons, which comprises passing to a hydrogenation process an initial normally liquid hydrocarbon material boiling in the motor fuel range and comprising normally liquid unsaturated hydrocarbons of not more than twelve carbon atoms per molecule, adding thereto a recycle saturated hydrocarbon material of similar boiling characteristics and substantially completely saturated in an amount sufficient to produce a resultant mixture containing saturated and unsaturated hydrocarbons in a ratio between 1:1 and 9:1, passing the resulting mixture predominantly in liquid phase to the top of a vertical elongated hydrogenation chamber containing a hydrogenation catalyst in a hydrogenation zone and operated without substantial loss of heat to a heat exchange medium in indirect heat exchange relationship with said hydrogenation zone, flowing liquid hydrocarbons from top to bottom through said hydrogenation chamber, maintaining in said hyrogenation zone reaction conditions suitable for nondestructive hydrogenation and such that a substantial amount of hydrocarbon material present therein is in liquid phase at the top of said zone and also such that at least a part of the reacting hydrocarbon material immediately before leaving said zone will still be in liquid phase, liquid hydrocarbon material vaporizing as it passes through said zone as a result of exothermic heat of reaction, adding free hydrogen to said hydrogenation zone in an amount in excess of that required to saturate unsaturated hydrocarbons charged to said chamber, withdrawing gases and vapors from the top of said hydrogenation zone, subjecting said gases and vapors to cooling and condensation to recover hydrocarbons contained therein and returning hydrocarbons so recovered to said hydrogenation zone, withdrawing a saturated hydrocarbon material from the bottom of said hydrogenation chamber having substantially the same boiling characteristics as said initial normally liquid hydrocarbon material, returning a portion of said saturated hydrocarbon material to the top of said hydrogenation chamber as said recycle saturated material, and recovering a further portion of said material as a product of the process.

FREDERICK E. FREY.